(12) United States Patent
Kinoshita

(10) Patent No.: US 6,886,328 B2
(45) Date of Patent: May 3, 2005

(54) EXHAUST GAS PROCESSING SYSTEM

(76) Inventor: Yukio Kinoshita, 7-8, Mikanohara-cho 2-chome, Hitachi-shi, Ibaraki 316-0026 (JP)

( * ) Notice: Subject to any disclaimer, the term of this patent is extended or adjusted under 35 U.S.C. 154(b) by 0 days.

(21) Appl. No.: 10/601,628

(22) Filed: Jun. 24, 2003

(65) Prior Publication Data

US 2004/0055286 A1 Mar. 25, 2004

(30) Foreign Application Priority Data

Jun. 25, 2002 (JP) ........................................ 2002-184759

(51) Int. Cl.[7] ................................................ F01N 3/00
(52) U.S. Cl. .............................. 60/275; 60/295; 60/297; 60/311; 60/301
(58) Field of Search ........................... 60/275, 295, 297, 60/311; 55/DIG. 30; 422/169, 174, 175

(56) References Cited

U.S. PATENT DOCUMENTS

| | | | | |
|---|---|---|---|---|
| 4,345,431 A | * | 8/1982 | Suzuki et al. .................. | 60/286 |
| 4,406,119 A | * | 9/1983 | Kamiya et al. ................ | 60/275 |
| 4,649,703 A | * | 3/1987 | Dettling et al. ................ | 60/275 |
| 4,693,078 A | * | 9/1987 | Dettling et al. ................ | 60/295 |
| 4,989,408 A | * | 2/1991 | Leonhard et al. ............. | 60/303 |
| 5,253,476 A | * | 10/1993 | Levendis et al. ............. | 60/279 |
| 5,458,850 A | * | 10/1995 | Krutzsch et al. .............. | 422/21 |
| 5,557,923 A | * | 9/1996 | Bolt et al. ..................... | 60/274 |
| 6,536,211 B1 | * | 3/2003 | Borgstrom et al. ........... | 60/311 |

FOREIGN PATENT DOCUMENTS

JP 59-058111 * 4/1984

\* cited by examiner

*Primary Examiner*—Thomas Denion
*Assistant Examiner*—Diem Tran
(74) *Attorney, Agent, or Firm*—Antonelli, Terry, Stout & Kraus, LLP

(57) ABSTRACT

In a pre-process, a particle shape substance is decomposed and removed using a cyclone and an electric dust collection apparatus, NOx in an exhaust gas is decomposed completely using discharge, to establish technique for generating $NO_2$ for necessary to oxidize a particle shape substance in a real time. The generated $NO_2$ and ozone and active oxygen generated the particle shape substance is decomposed completely. $NO_2$ for necessary to the particle shape substance is generated and is processed in response to operation condition of an engine.

9 Claims, 6 Drawing Sheets

FIG. 3A
FIG. 3B
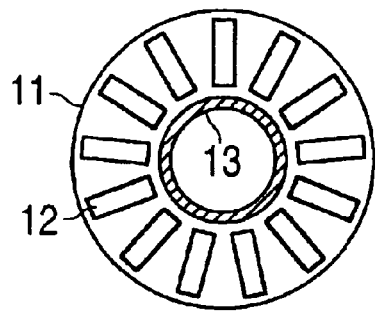
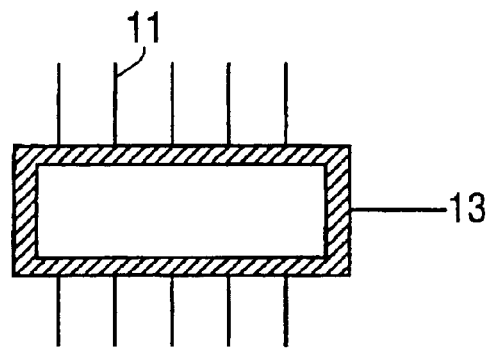
FIG. 3C
FIG. 3D
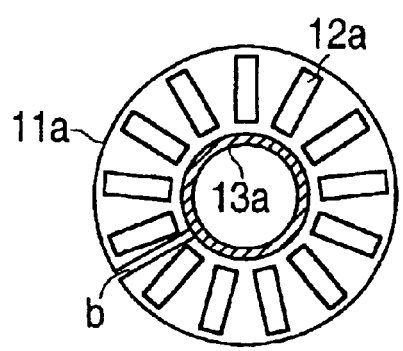
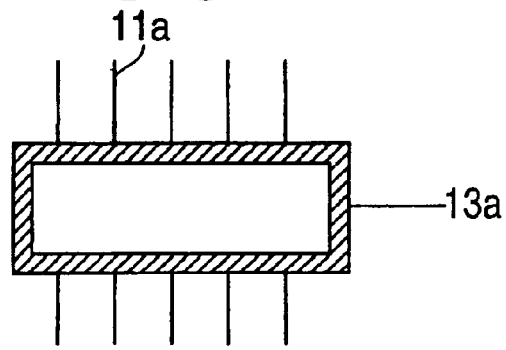
FIG. 3E
FIG. 3F
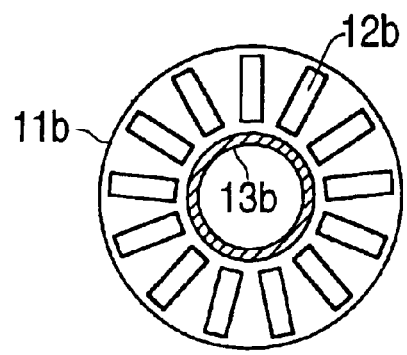
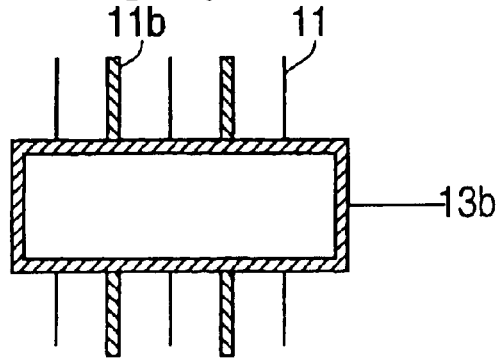

EXHAUST GAS PROCESSING SYSTEM

BACKGROUND OF THE INVENTION

1. Technical Field

The present invention relates to an exhaust gas processing system and an exhaust gas processing apparatus in which a composition of a harmful chemical substance of an exhaust gas etc. which is exhausted from a boiler including NOx, a particle shape substance and hydrocarbon and an engine etc. and a chemical reaction etc. of a harmful substance are promoted and a chemical work and an environment machine and apparatus.

2. Prior Art

Up to now, a processing technique having a low cost and high for processing NOx in an exhaust gas and fine particles in a harmful substance has not established in world. As a removal technique for NOx, a dintoration technique using an ammonium is established as a fixed machine of a boiler and an engine but this technique has not employed in a moving machine such as an automobile from an aspect of the safety.

To NOx removal for a diesel vehicle it take a countermeasurement with a high pressure injection of the engine and a figuration of a combustion chamber but with only this counter measurement a satisfied technique has not established. There is a device in which as to NOx in the exhaust gas using a noble metal catalyst such as a platinum and paradigm etc. NOx generates and using a catalyst in a post-process the fine particles are decomposed but NOx reduction effect is low about 15% and a regular processing apparatus has not established. Further, there is a three-way catalyst in which the noble metal is contained mainly but this is high cost and is not to be practical use. In this, since the platinum used in the catalyst lowers the catalyst function due to the sulfur in the fuel, a spread of a low sulfur fuel sets as premise.

On the other hand, as the removal technique for the particle shape substance a technique in which as the above stated oxidation decomposition using NOx the noble metal such as platinum is low temperature decomposed has established but this is high cost the regular spread has not attained. Now, a method for processing, in which using a ceramic filter the fine particles are adsorbed and after the adsorption this is processed in the combustion, has established. However, a batch processing and an alternative processing system in a plural processing system has established but since this invites the high cost and the badness in use manner, the regular spread is obstructed.

In the diesel engine, according to the operation conditions, the components in the harmful substances in the exhaust gas changed largely, the method in which all the present processing apparatuses is followed and processed and an apparatus in which the processing function lowering is regenerated in a real time are not realized.

It is established a technique wherein the generated $NO_2$ and the ozone generated in an oxygen atmosphere and an active oxygen are used as an oxidation agent, the particle shape substance is composed completely using a low cost catalyst under a low temperature about 300 C or not using completely the catalyst.

It is established a technique wherein by following an operation condition of the engine, a processing is carried out in a real time. It is established a technique wherein a construction having a low cost and a durability performance is attained.

It is established an apparatus in which an ammonia generation means is accompanied independently and the processing of NOx etc. is functioned effectively.

It is established a technique about a generator system having a high heat resistance and a superior efficiency wherein when an exhaust gas is processed according to a discharge and an electric application, an additionally electric capacity is compensated and it has been a compatibility with an already established generator.

SUMMARY OF THE INVENTION

An object of the present invention is to provide an exhaust gas processing apparatus wherein in which the particle shape substances are separated and removed and NOx in the exhaust gas is decomposed using discharge.

Another object of the present invention is to provide an exhaust gas processing apparatus wherein in which the particle shape substances are processed with a real time by complying with the operation states of an engine.

(1) As a solving measure for the technique wherein, without the affect of sulfur, in a pre-process using the cyclone and the electric dust collection, the particle shape substance is separated and removed, using the discharge NOx in an exhaust gas is decomposed completely, and as to the particle shape substance which has not separated in the pre-process, and a necessary $NO_2$ for oxidizing the fine particles under a low temperature of about 300 C is generated in a real time.

Firstly, as a means for carrying out without receipt of the affect of sulfur in the fuel, the generation of $NO_2$ is carried out not using the noble metals such as platinum as the catalyst. Namely, the particle shape substance having the large particle diameter is separated by the centrifugal force using the cyclone, and the particle shape substance having the small particle diameter is removed using the electric dust collection. Next, NOx is decomposed using a barrier discharge etc. and $NO_2$ necessary to decompose the particle shape substance is generated in NO in NOx.

As a concrete example, to lower the voltage applied to the electrode as possible, one of the electrodes is formed by the anode oxidation with a long line shape, a belt shape, a rod shape, or a plate shape, and an outer skin of a superior permeability performance and thin insulation body such as a ceramic, and a heat resistance silicone etc. is covered.

Another of the electrodes is formed with a bare wire suited to a shape of the insulation core wire and along to the insulation core wire is arranged closely in a parallel shape, a rectangular shape, a spiral shape, a net shape, or a zigzag shape by performing the anode oxidation film and the ceramics coating to obtain the anti-environment performance and then the ozone and the barrier discharge is generated effectively.

The alternating current high voltage is applied to the electrodes and the voltage and the frequency number are changed, in conform to the raise of the voltage, NO in an exhaust gas containing a residual oxygen is lowered and it has became zero when it is reached to same voltage.

On the other hand, $NO_2$ is increased gradually slightly (less than $1/10$) at first in comparison with NO and $NO_2$ is existed in a range of zero and it is shown a peak value and when the voltage is lowered further it is reduced gradually and becomes zero soon. At this time point, NOx is gone out of existence completely.

In this case, the more an oxygen concentration and a hydrocarbon concentration is high, the more a range for vanishing completely NO and NOx is existed wide. Namely, it is possible to make the energy of NOx decomposition small and is carried out the stable processing. By controlling the oxygen concentration and the hydrocarbon concentration, it is possible to obtain from a V curve to a reverse trapezoid curve having long bottom face.

In the exhaust gas processing system, when the above stated concentrations are controlled, it is possible to carry out a further stable exhaust gas processing. Further, when the voltage is increased further, in some voltage NO is increased from zero and $NO_2$ is shifted to increase, it is possible to obtain an increase characteristic.

By applying this phenomenon, in the range of NO being zero, it is possible to control in a moment of time a range from a peak value to zero according to a slight change of the voltage. By following the operation of the engine and by suiting an amount of the particle shape substance, $NO_2$ necessary for converting to $NO_2$ is generated in a real time. This control is carried out in a small area and a high area of the discharge energy.

It is necessary to set a discharge element and a power supply means suited to the size of the engine and the operation condition and a capacity of the means necessary to the control. When the barrier discharge in this example is used, in the discharge element of 30 cm, it is possible to process with a comparatively low voltage of 18 kHz, 6.5 kv degree and a small consumption electric power of from 10 W to 20 W.

Further, in a case of the spiral shape discharge wire, it is resulted that a winding pitch of about 10 mm is obtained the most superior decomposition efficiency.

(2) As a solving measure of the technique wherein the generated $NO_2$ in the above stated item (1) and the ozone generated in an oxygen atmosphere and an active oxygen are used as an oxidation agent, the particle shape substance is decomposed completely using a low cost catalyst under a low temperature about 300 C, since the amount of $NO_2$ and the ozone (more than 400 C, this has became the active oxygen) is controlled freely with the voltage, the frequency number and the oxides of vanadium and molybdenum, the zeolite and the alumina are used as the catalyst and under the low temperature about 300 C, without of the bare use of the noble metal the particle shape substance is decomposed completely.

Further, using the nitric acid which is formed by the generated $NO_2$ and the water in the gas and the sulfur oxide such as sulfuric acid which is formed by the oxidation of sulfur in the fuel, without the catalyst it is possible to decompose the particle shape substance and to control the generation amount of $NO_2$.

(3) A solving measure of the technique wherein by following the operation condition of the engine and it is carried out in the real time, using $NO_2$ control technique stated on the above item (1), by following to the operation condition of the engine, the necessary $NO_2$ amount is calculated using the sensor and the operation characteristic or is generated immediately and then the particle shape substance is decomposed completely.

A particle shape substance sensor is arranged in an inlet port of the processing apparatus, the particle shape substance is sensed in the real time, and the information thereof is inputted to a controller.

On the other hand, in before and after of a flow passage of the processing apparatus, NOx sensor or $NO_2$ sensor is arranged, and it is grasped that whether the concentration of after the pass-through of the processing apparatus has been in an increase condition or in a decrease condition, $NO_2$ amount for necessary to the complete decomposition of the particle shape substance is calculated according to NOx concentration and NO concentration after the processing.

The voltage value suited to the necessary energy is determined and the voltage is controlled in the real time, as a result NOx and the particle shape substance are removed completely.

(4) A solving measure for attaining the above stated items (1)–(3) with the low cost structure, in the exhaust gas processing system according to the present invention, three large material elements in the cost aspect are existed and these three material elements have been the discharge element, the low temperature catalyst, and the control means.

Firstly, as the discharge element, this element has been a simple structure in which around the thin and long discharge core wire the discharge wire is arranged with the spiral shape, for example. With the technique for manufacturing the optical fiber and the electric wire, the large amount discharge elements are manufactured simple and the discharge element having the superior reliability is manufactured.

Next, as to the catalyst, as stated in the above stated item (2), in basically without the use of the noble metal wholly, it is realized the use of about a few amount of 0.2% in the weight percentage and to the oxides of vanadium and molybdenum having the comparative low cost since the alumina and the zeolite are coexisted, compared with the conventional catalyst in which the noble metal is main, it is settled with the very low cost.

As a power supply and a control unit, NO decomposition and $NO_2$ generation are performed with a comparative low electric power and further the control is performed using a simple technique with the voltage and the frequency.

BRIEF DESCRIPTION OF DRAWINGS

FIGS. 3A and 3B are explanatory views showing an example of the barrier discharge unit according to the present invention.

FIGS. 3C and 3D are explanatory views showing an example of a spiral shape discharge disc plate of the barrier discharge unit according to the present invention.

FIGS. 3E and 3F are explanatory views showing an example of a discharger partition disc plate of the barrier discharge unit is performed.

DESCRIPTION OF THE INVENTION

Figure 1A:
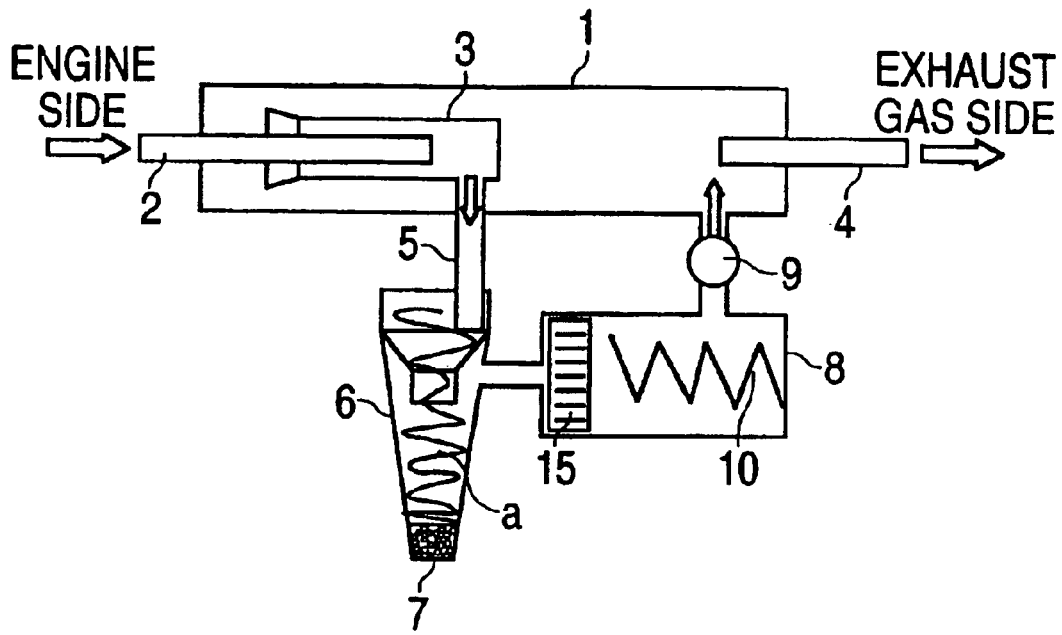
FIG. 1A is a cross-sectional explanatory view showing an exhaust gas processing apparatus in which in a pre-process the particle shape substance are caught and processed by the cyclone and the electric dust collection according to the present invention and in a post-process NOx is decomposed using the high voltage discharge it enable to follow the dynamic change in the engine etc..
Figure 1B:
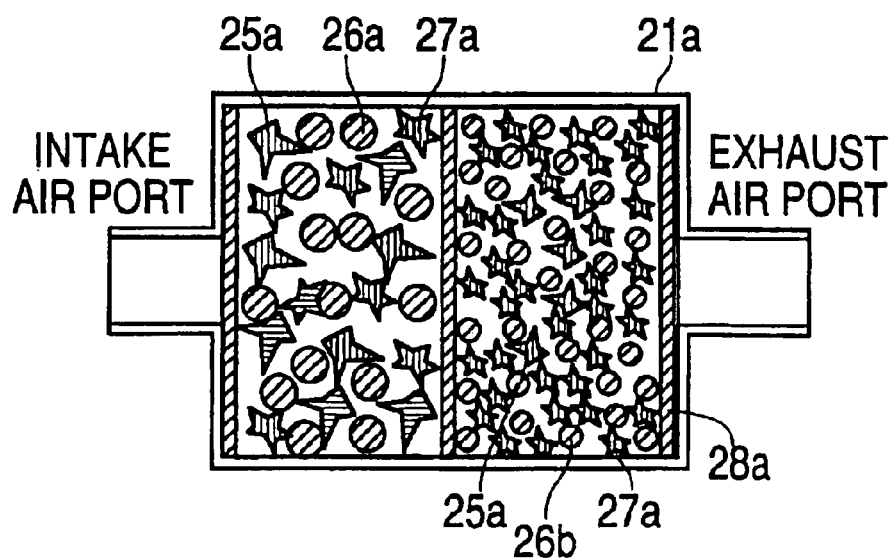
FIG. 1B is a cross-sectional explanatory view showing an exhaust gas processing apparatus according to the prior art in which in a pre-process and a post-process the catalyst using the noble metals is used.

Hereinafter, the examples of the carrying out embodiments according to the present invention will be explained. FIG. 1A is an exhaust gas processing apparatus of one embodiment according to the present invention and FIG. 1B is an exhaust gas processing apparatus of one embodiment according to the prior art.

The features of the present invention are classified largely to two processing units, in a pre-process in a cyclone 6 the particle shape substance is caught and processed, in a post-process in NOx decomposition unit 8 according to a barrier discharge NOx is decomposed and $NO_2$ necessary to decompose the amount of the residual particle shape substance in which NO in the exhaust gas have not processed in the pre-process is generated and $NO_2$ is made to form $CO_2$ using the catalyst etc..

In the exhaust gas processing unit, the exhaust gas from an engine is processed in a bypass flow passage, which is separated from an exhaust gas main flow. Namely, the exhaust gas from the engine flows into through an exhaust pipe 2 and in an interference chamber 1 the exhaust gas is caught in a coupling pipe 3, which is connected with a fluid state, and the exhaust gas is led into the cyclone 6 through a pipe 5. As a motive force therefor a blower 9 is provided. Most of the exhaust gas which is led into the cyclone is swirled as shown in an arrow mark a and then the particle shape substance are caught in a bottom portion 7 of the cyclone 6. At an upper portion of a separation chamber of the cyclone the particle shape substance is removed and a bypass flow of the exhaust gas in which NOx is standardized is led into NOx decomposition unit 8, in a barrier discharge electrode portion 10 the decomposition and NO2 generation are carried out. A reference numeral 4 denotes an exhaust gas pipe, which is connected to a muffler etc. A high voltage power supply portion and a control portion are omitted.

Further, in a suitable portion between the inner portion of the cyclone 6 and NOx decomposition unit 8 a clothe shape filter or a sponge shape filter for catching the fine particle shape substance may be provided, and using the filter as an electric dust collection portion 15 the particle shape substance can be caught effectively with approximate 100% rate.

The conventional exhaust processing apparatus shown in FIG. 1B will be explained. In the pre-process, the large amount platinum 25a, paradigm 26a and aluminum 27a use and NO in NOx oxidizes NO2 and in the catalyst in the post-process the particle shape substance is oxidation-harmless. Since the noble metal is used, it invites the high cost and the spread obstructs greatly. In this catalyst system, against to the operation of the engine etc., for example by following the generation conditions of the particle shape substance, it is impossible to carry out the processing and it is impossible to take the consideration to the affect and detorition of sulfur. The removal of NO is not carried out completely and NO of 85% is not discharged from an exhaust port. This can say the complement apparatus.

In the post-process, the metal is used mainly as the catalyst and platinum 25b, paradigm 26b and aluminum 27b use and the processing are carried out. A reference numeral 21a is a frame of the machine and apparatus, and a reference numeral 28a is a partition wall having a good transparency for holding the catalyst.

Figure 2A:
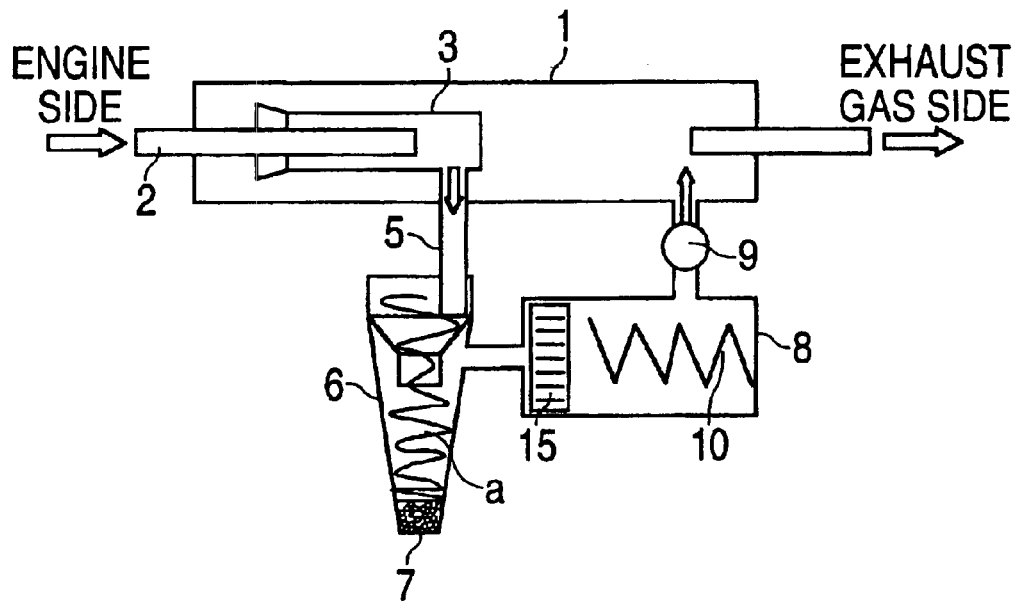
FIG. 2A is a cross-sectional explanatory view showing an exhaust gas processing apparatus in which in a pre-process the particle shape substance is caught and processed by the cyclone and the electric dust collection according to the present invention and in a post-process NOx is decomposed using the high voltage discharge it enable to follow the dynamic change in the engine etc..
Figure 2B:
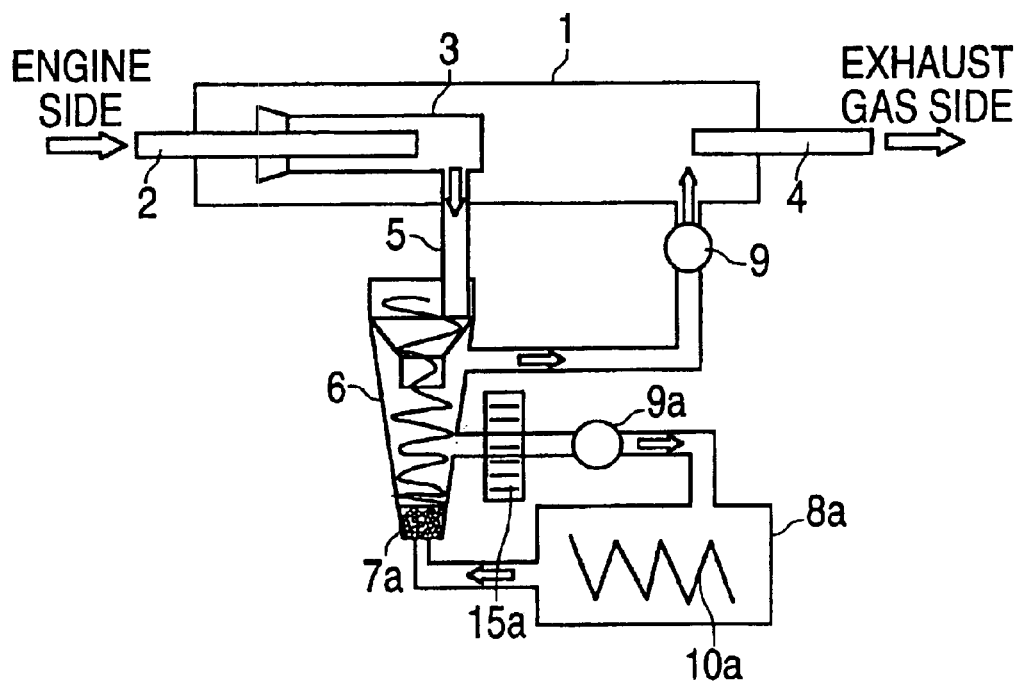
FIG. 2B is a cross-sectional explanatory view showing a discharge portion in which in a pre-process the particle shape substance is caught and processed by the cyclone and the electric dust collection according to the present invention and in a post-process NOx concentration is controlled and in the pre-process the caught particle shape substance is processed completely in a catalyst portion.

FIG. 2A and FIG. 2B will be explained. FIG. 2A is the same to FIG. 1A and the explanation thereof will be omitted. FIG. 2B shows an example of a system, NO in NOx in the caught particle shape substance 7a is oxidized in a discharge electrode portion 10a of NOx processing portion 8a and a necessary $NO_2$ is generated and supplied using the blower 9a. Then the particle shape substance is made to form $CO_2$ and is returned into the exhaust gas.

The caught particle shape substance may be processed using the catalyst and the heater. As to the catalyst, without the use of the noble metals etc., ge-site of iron oxide and zeolite having the comparative low cost can be used, and using calcium compound the particle shape substance is burned and processed using the heater. Further the heater and the catalyst can be used together.

Since the particle shape substance is stored in the bottom portion of a vessel by the force of cyclone, the bottom portion of the vessel may be made by the high heat insulation performance material such as ceramics and further by utilizing effectively the heat generated during the burning time the processing of the particle shape substance can be carried out perfectly with a real time.

The shape of the collection portion of the particle shape substance is made to form a guitar shape and it can have the heat insulation effect. Further, according to the provision of a collection box arranged at a lower portion of the collection portion, the particle shape substance can be discharged in a suitable time and the easily construction having the low cost processing apparatus can be attained. Before the gathering in the collection box using a screw compression machine the particle shape substance is caught and then the processing efficiency can be heightened. A reference numeral 15a denotes the electric dust collection portion.

Next, FIG. 3A to FIG. 3C will be explained. FIG. 3A is a structural view showing an example of a barrier discharger structure used for NOx decomposition and NO2 generation. To an outer periphery of an insulation electrode portion 13, which is covered by an insulation film such a thin anode oxidization film, the discharger disc plates 11 having discharge portion slits 12 are arranged in a solid structure with suitable spaces. The discharger disc plates are connected mutually and electrically.

When the high frequency and high voltage power supply is applied to between the discharger and the insulation electrode, the corona discharge generates from the outer periphery of the discharger disc plate 11 and an end face of the discharge slit 12. When NOx gas contacts to these discharge portions, the decomposition and the chemical reaction generate.

The condition of the discharge varies in accordance with a stretching length of the discharge end face, the thickness of the insulation materials of the insulation electrode and the voltage and the frequency number of the high frequency and high voltage power supply to be applied. When an arrangement pitch of the discharger disc plate 11 is 10 mm and a stretching length of the discharge end face is 500 mm, a good data having the high discharge decomposition efficiency is attained.

By the arranging with the solid structure of the construction of the discharger disc plate, the leakage between the electrodes due to the dirty of the particle shape substance is lessened, and further to arise the durability performance a thin insulation film is performed on a part or a whole of an inner portion of an inside portion of the disc plate. As a result the durability performance against to the dirty of the particle shape substance, etc. can be heightened remarkably.

FIG. 3B shows an example in which, in a discharger disc plate of the discharge element, a slit b is formed on a part of this disc plate and the discharger disc plate 11a is formed, further on an outer periphery of an insulation electrode portion 13a the discharger disc plate 11a is arranged with a spiral form.

Then the flow resistance of the exhaust gas is lessened and at the same time the exhaust gas is contacted easily with the corona, which is generated in an end portion of the discharger, and accordingly the reaction efficiency is improved. In this case, the discharger electrodes 11a are connected mutually and electrically.

FIG. 3C shows an example in which to improve the anti-pollution performance of the particle shape substance stated on FIG. 3A the insulation plates 11b are arranged to the discharger disc plate 11 every one by one. A reference numeral 12b denotes the slit 13, and a reference numeral 13b denotes the insulation electrode portion.

Figure 4A:
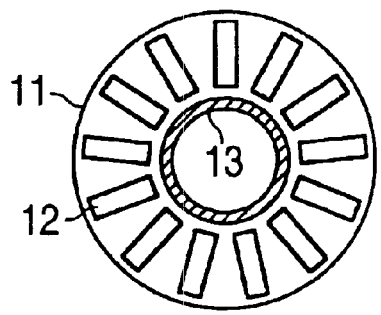
FIGS. 4A and 4B are explanatory views showing an example of the barrier discharge unit according to the present invention.
Figure 4B:
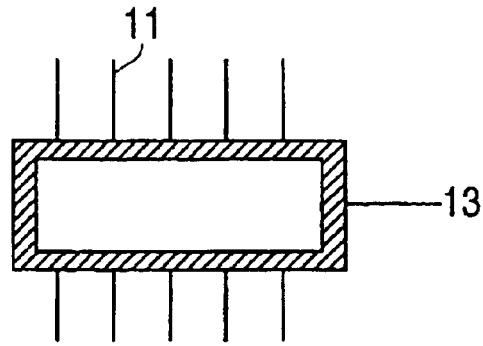

From FIG. 4A to FIG. 4C will be explained. FIG. 4A shows the barrier discharge portion which is the same to the FIG. 3A. FIG. 4B shows an example in which the insulation film is formed with a lamination layer using a thin insulation film insulation bodies 14a and 14b, which are processed on an insulation substance of the insulation electrode portion 13C shown in FIG. 4A, by the anode oxidization film etc. and the necessary electric insulation withstanding force is given.

Figure 4C:
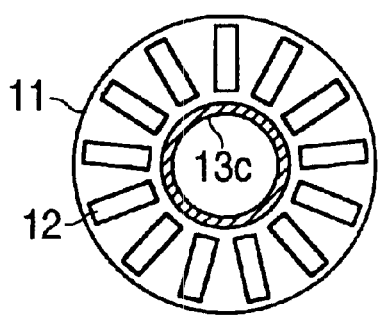
FIGS. 4C and 4D are explanatory views showing an example of a laminated insulation portion of the insulation electrode portion of the barrier discharge unit according to the present invention.
Figure 4D:
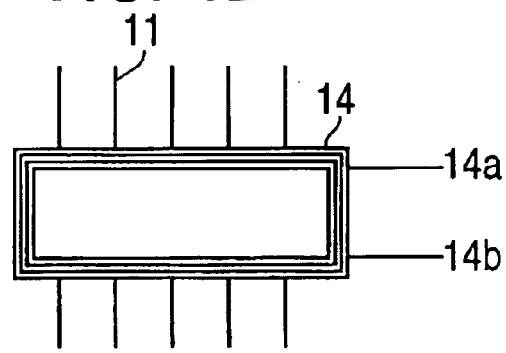
Figure 4E:
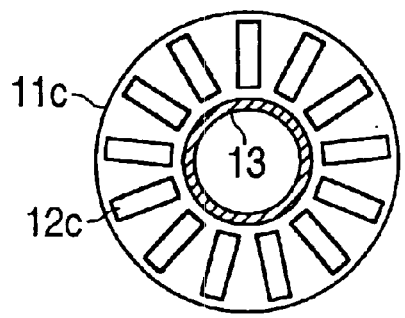
FIGS. 4E and 4F are explanatory views showing an example of a discharge disc plate in which a thin film insulation of the barrier discharge unit is performed.
Figure 4F:
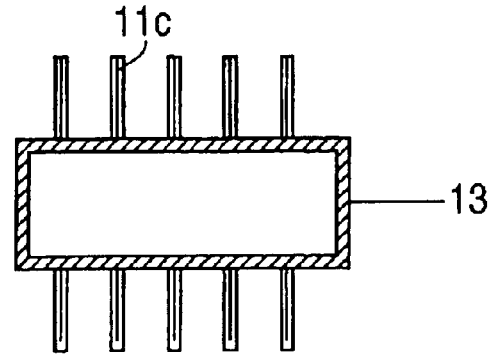

FIG. 4C shows an example of the discharger disc plate 11c in which, on a surface of the discharge disc plate 11 shown in FIG. 4A, to give the anti-environment performance against the heat, the oxidation and the arc, to the metal base material such as alumina and titanium the anode oxidation film is performed directly or on a surface of the iron or the chrome steel a thin film such as titanium is carried out the cladding and the surface thereof is carried out the oxidation processing and is finished. A reference numeral 12c denotes a discharge slit, which is provided on the discharger disc plate 11.

Figure 5A:
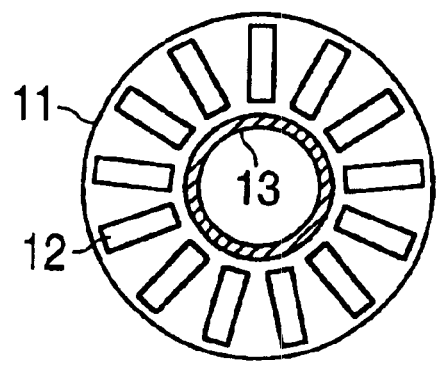
FIGS. 5A and 5B are explanatory views showing an example of the barrier discharge unit according to the present invention.
Figure 5B:
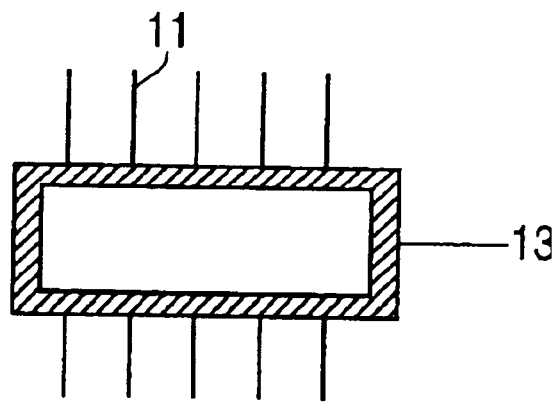
Figure 5C:
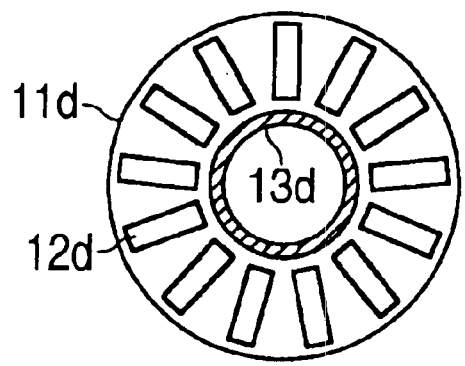
FIGS. 5C and 5D are explanatory views showing an example of a laminated layer insulation portion of the insulation electrode portion of a discharger disc plate in which a thin film insulation is performed.
Figure 5D:
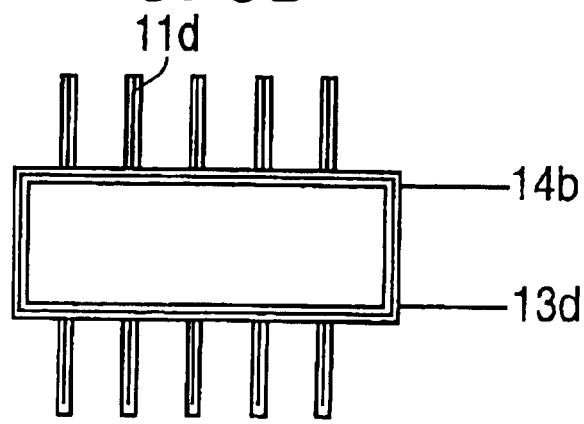

FIG. 5A and FIG. 5B will be explained. FIG. 5A shows the barrier discharger which is the same to one shown in FIG. 3A. FIG. 5B shows an s example in which to promote the anti-environment performance the insulation electrode portion 13c and the insulation film 14 shown in FIG. 4B and the discharger disc plate 11 shown in FIG. 4C in which the insulation covering film is performed are combined and more anti-environment performance is promoted. A reference numeral 11d denotes a discharger disc plate and a reference numeral 14b denotes an insulation body having the thin insulation film, which is processed by the anode oxidation film etc.

Figure 6:
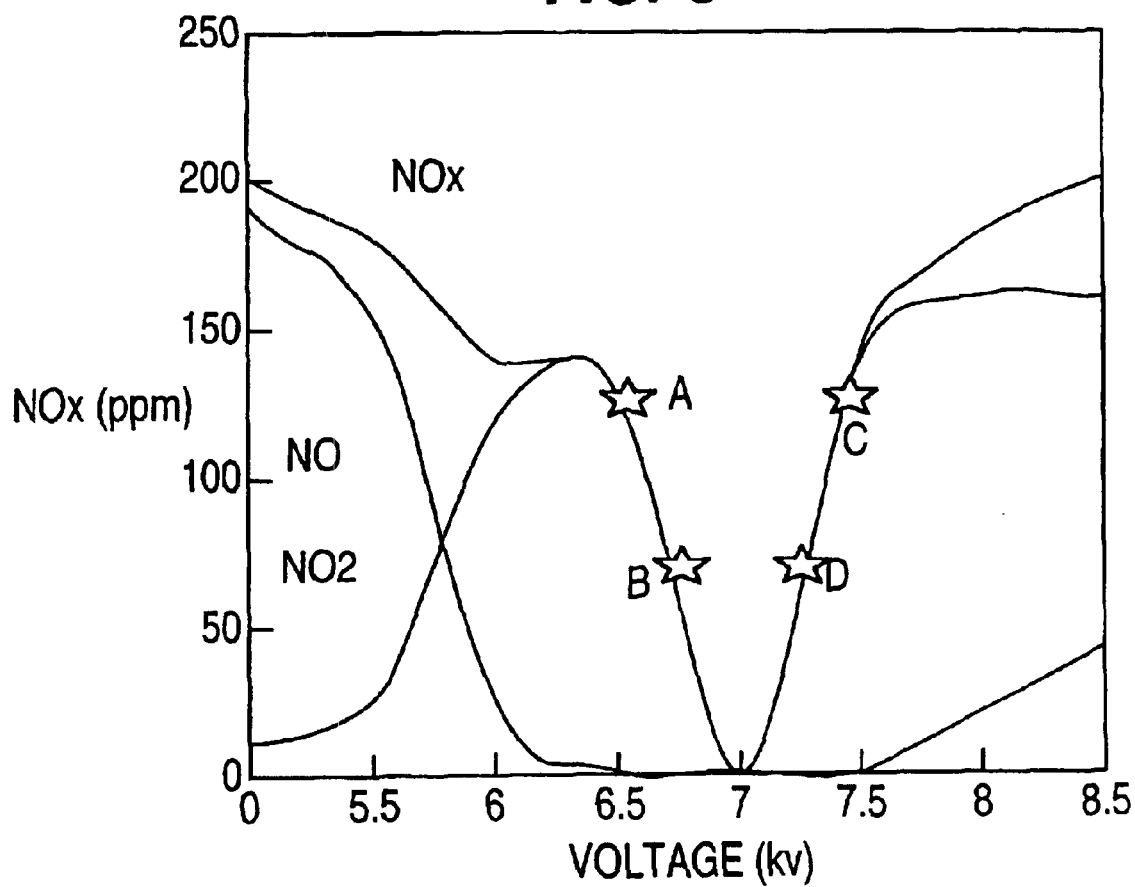
FIG. 6 is NOx (NO, $NO_2$) reduction characteristic explanatory view of a spiral shape discharge portion.

FIG. 6 shows one example of the characteristic of NOx decomposition in the barrier processing unit against the alternating current application voltage. By the changes of the voltages, the conditions of the changes of NOx, NO and $NO_2$ will be understood.

NO reduces abruptly in company with the voltage arise and vanish completely in 6 kV and continues zero (0) until 7.5 kV and further when the voltage arises the concentration increases gradually. When NO is zero (0) condition, NOx presents only $NO_2$ condition and between from 6.5 kV to 7.5 kV, it changes abruptly with V shape between from 130 ppm to zero (0). Accordingly, utilizing this characteristic, it attains the complete processing of the NO and shows the possibility about the decomposition of the particle shape substance without the residual NOx. By suiting the combustion conditions of the engine and the boiler the harmful exhaust gas becomes completely to the harmless one in the real time.

In the conventional apparatus and machine, it is impossible to carry out the adjustment, even in some conditions the most suitable characteristic may obtain, but it is impossible to follow the concentration change of the harmful substances in the exhaust gas in company with the largely changed operation condition. Further, as to the characteristic inferior in the use condition no solving countermeasurement exists.

The above stated exhaust gas processing apparatus has the comparative simple structure in comparison with that of the prior art apparatus and has the epoch-making gas processing technique which enable to make the harmless performance of the harmful exhaust gas by following the operation conditions of the engine etc. and utilizes all fields relating to the decomposition of the gas and the reaction.

This apparatus utilizes effectively to the pollution counter measurement of the automobiles, the boilers and the engines and the chemical reaction promotion, the combustion promotion, and the decomposition of the harmful substances. Further, the discharge portion can manufactures from the advanced production techniques of the wire and the optical fiber and accordingly the ozone generation apparatus having the high quality, the superior production performance, and the simple structure and the low cost or the corona generating apparatus can provide.

Further, by the provisions of the cyclone having the simple structure and the interference chamber effective for the standardization of the exhaust flow amount, the particle shape substance can be caught stably, and to the response to the demand the particle shape substance is processed completely using the bug filter and the electric dust collection.

The effects according to the present invention has the excellent effects as the exhaust gas post-processing apparatus such as the automobiles and the boilers the performance, the cost performance and the maintenance performance can be solved at a stroke. The main effects are as following:

1. With the simple discharge wire structure, NOx (NO and $NO_2$) decomposes completely, the generation amount of and $NO_2$ for oxidizing an decomposing the particle shape substances is controlled freely under the zero condition of NO and $NO_2$), and it follows completely to the decomposition of the particle shape substances in the exhaust gas. The catalyst used in this case does not employ almost the noble metals and is oxidized under the low temperature of 300 C and is exhausted with the harmless carbon dioxide.

2. The particle shape substances are adsorbed to the ceramic filter and the portions necessary for the burning up of the adsorption face are detected by the plural electrodes, with the power supply of the low voltage the particle shape substances are burned up selectively and electrically and are made as the carbon dioxide and are formed as the harmless substances. Accordingly, the apparatus and machine for processing the on-board real time and having superior maintenance performance realizes.

What is claimed is:

1. An exhaust gas processing apparatus used in a diesel vehicle, comprising:

an interference chamber having a first exhaust gas pipe at an engine side of said interference chamber and a second exhaust gas pipe at an exhaust gas side of said interference chamber;

a centrifugal separation machine provided at a downstream side of said first exhaust gas pipe of said interference chamber; and an NOx decomposition unit connected to said centrifugal separation machine and provided at an upstream side of said second exhaust gas pipe of said interference chamber, wherein:

said centrifugal separation machine is arranged separately from said interference chamber, said NOx decomposition unit is arranged separately from said interference chamber; and said NOx decomposition unit includes a barrier discharge electrode portion, and said barrier discharge electrode portion comprises an insulation electrode portion and plural discharger disc plates having plural discharge portion slits at an outer periphery of said insulation electrode portion, whereby a particle shape substance in an exhaust gas is caught.

2. An exhaust gas processing apparatus according to claim 1, wherein:

said centrifugal separation machine is provided in a front stage of a processing system having said interference chamber, whereby an efficiency of said centrifugal separation machine is improved.

3. An exhaust gas processing apparatus according to claim 2, wherein:

to improve said centrifugal separation machine, an air pressure generation apparatus is constituted in said processing system having said interference chamber.

4. An exhaust gas processing apparatus according to claim 1, wherein:

said centrifugal separation machine combined with an electric dust collection apparatus of the exhaust gas processing apparatus.

5. An exhaust gas processing apparatus used in a diesel vehicle, comprising:

an interference chamber having a first exhaust gas pipe at an engine side of said interference chamber and a second exhaust gas pipe at an exhaust gas side of said interference chamber;

a centrifugal separation machine provided at a downstream side of said first exhaust gas pipe of said interference chamber; and an NOx decomposition unit connected to said centrifugal separation machine and provided at an upstream side of said second exhaust gas pipe of said interference chamber, wherein:

said centrifugal separation machine is arranged separately from said interference chamber, said NOx decomposition unit is arranged separately from said interference chamber, said NOx decomposition unit includes a barrier discharge electrode portion, and said barrier discharge electrode portion comprises an insulation electrode portion and plural discharger disc plates having plural discharge portion slits at an outer periphery of said insulation electrode portion, and as an anti-environment material, at least one of a brush, a heater, a burner and a high pressure injection nozzle is provided separately from a processing system having said interference chamber.

6. An exhaust gas processing apparatus used in a diesel vehicle, comprising:

an interference chamber having a first exhaust gas pipe at an engine side of said interference chamber and a second exhaust gas pipe at an exhaust gas side of said interference chamber;

a centrifugal separation machine provided at a downstream side of said first exhaust gas pipe of said interference chamber; and an NOx decomposition unit connected to said centrifugal separation machine and provided at an upstream side of said second exhaust gas pipe of said interference chamber, wherein:

said centrifugal separation machine is arranged separately from said interference chamber, said NOx decomposition unit is arranged separately from said interference chamber, said NOx decomposition unit includes a barrier discharge electrode portion, and said barrier discharge electrode portion comprises an insulation electrode portion and plural discharger disc plates having plural discharge portion slits at an outer periphery of said insulation electrode portion, and to catch and decompose a particle shape substance in an exhaust gas and a substance containing at least NOx, said interference chamber mitigstes and averages a change of a flow in a front stage of a processing system having said interference chamber, 7. An exhaust gas processing apparatus according to claim 6, characterized in that said centrifugal separation machine is combined with an electric dust collection apparatus of the exhaust gas processing apparatus.

8. An exhaust gas processing apparatus according to any one of claims 1–6, wherein said centrifugal separation machine is separately arranged from said NOx decomposition unit, said NOx decomposition unit being downstream of said centrifugal separation machine.

9. An exhaust gas processing apparatus according to any one of claims 1–6, further comprising a dust collection filter between said centrifugal separation machine and said NOx decomposition unit.

* * * * *